United States Patent [19]

Ito et al.

[11] Patent Number: 4,921,464
[45] Date of Patent: May 1, 1990

[54] RADIO CHANNEL SEARCH SYSTEM

[75] Inventors: Koichi Ito; Isao Sasaki, both of Tokyo, Japan

[73] Assignee: Kabushiki Kaisha Toshiba, Kawasaki, Japan

[21] Appl. No.: 167,232

[22] Filed: Mar. 11, 1988

[30] Foreign Application Priority Data

Mar. 12, 1987 [JP] Japan .................................. 62-57409

[51] Int. Cl.⁵ ............................................. H04Q 7/00
[52] U.S. Cl. ........................................ 455/34; 455/54; 455/166; 455/343; 455/58; 379/62
[58] Field of Search ................... 455/34, 54, 56, 58, 455/68, 166, 343, 127, 266; 340/825.5; 379/61, 62, 64

[56] References Cited

U.S. PATENT DOCUMENTS

| | | | |
|---|---|---|---|
| 4,597,104 | 6/1986 | Ohki et al. | 455/166 |
| 4,622,695 | 11/1986 | Whiting | 455/58 |
| 4,694,485 | 9/1987 | Iwase | 379/62 |
| 4,698,748 | 10/1987 | Suzswik et al. | 455/343 |
| 4,716,407 | 12/1987 | Borras et al. | 455/166 |
| 4,794,649 | 12/1988 | Fujiwara | 455/343 |

FOREIGN PATENT DOCUMENTS

| | | |
|---|---|---|
| 0137943 | 4/1985 | European Pat. Off. |
| 0185138 | 6/1986 | European Pat. Off. |
| 0200209 | 11/1986 | European Pat. Off. |
| 0213929 | 3/1987 | European Pat. Off. |
| 0299515 | 1/1989 | European Pat. Off. |

*Primary Examiner*—Joseph A. Orsino
*Assistant Examiner*—Frank M. Scutch, II
*Attorney, Agent, or Firm*—Oblon, Spivak, McClelland, Maier & Neustadt

[57] ABSTRACT

A communication system is disclosed in which a speech path is selectively set up between a master station and mobile units through a plurality of radio channels. The number data of a limited number of priority channels is set in memory devices which are installed respectively in the master station and each mobile unit. In a receive-ready mode, in each station and units, the priority channels are intermittently subjected to the receive search. In other periods than the receive search periods, no power is supplied to the receive circuit of each station and units.

3 Claims, 7 Drawing Sheets

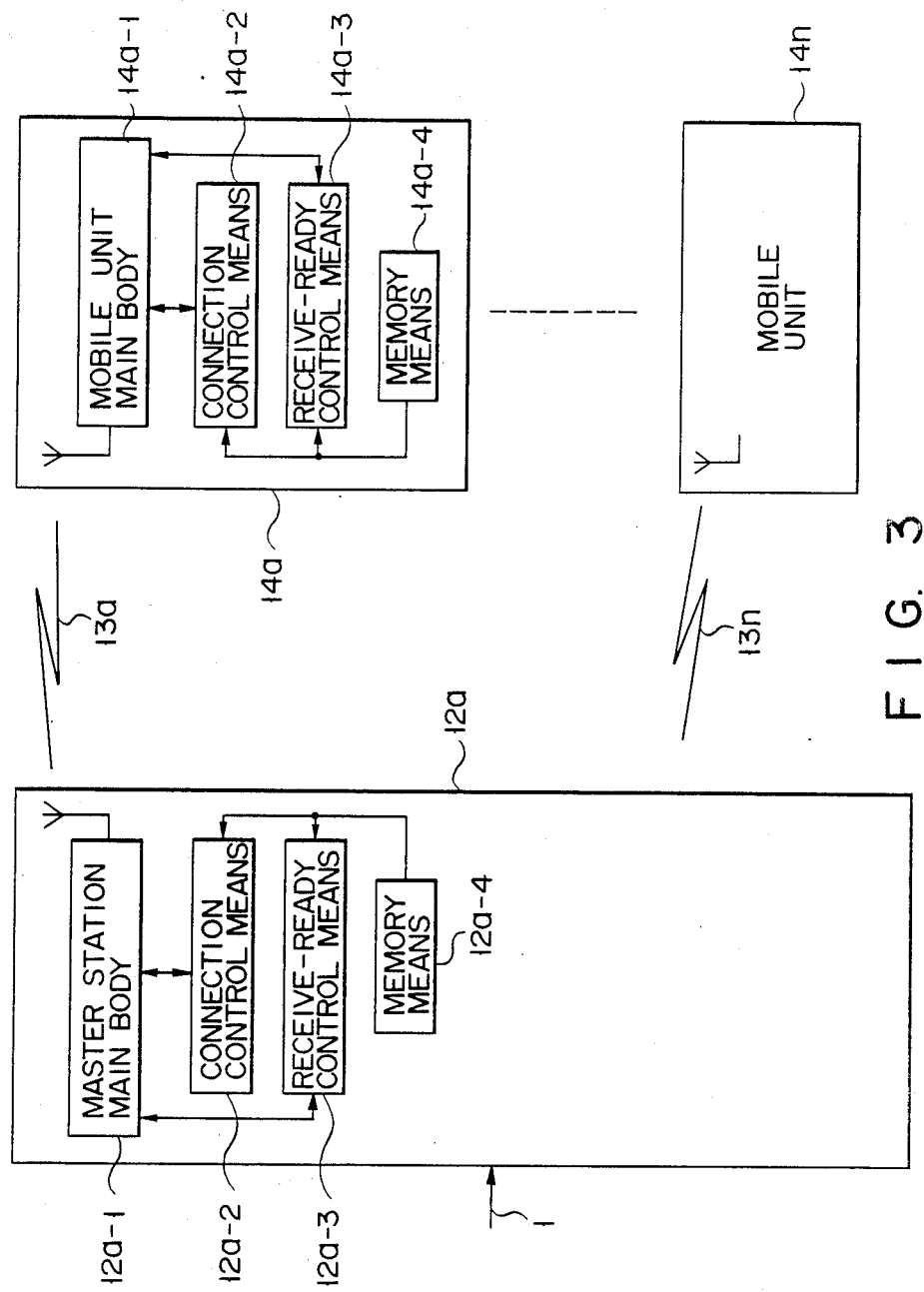

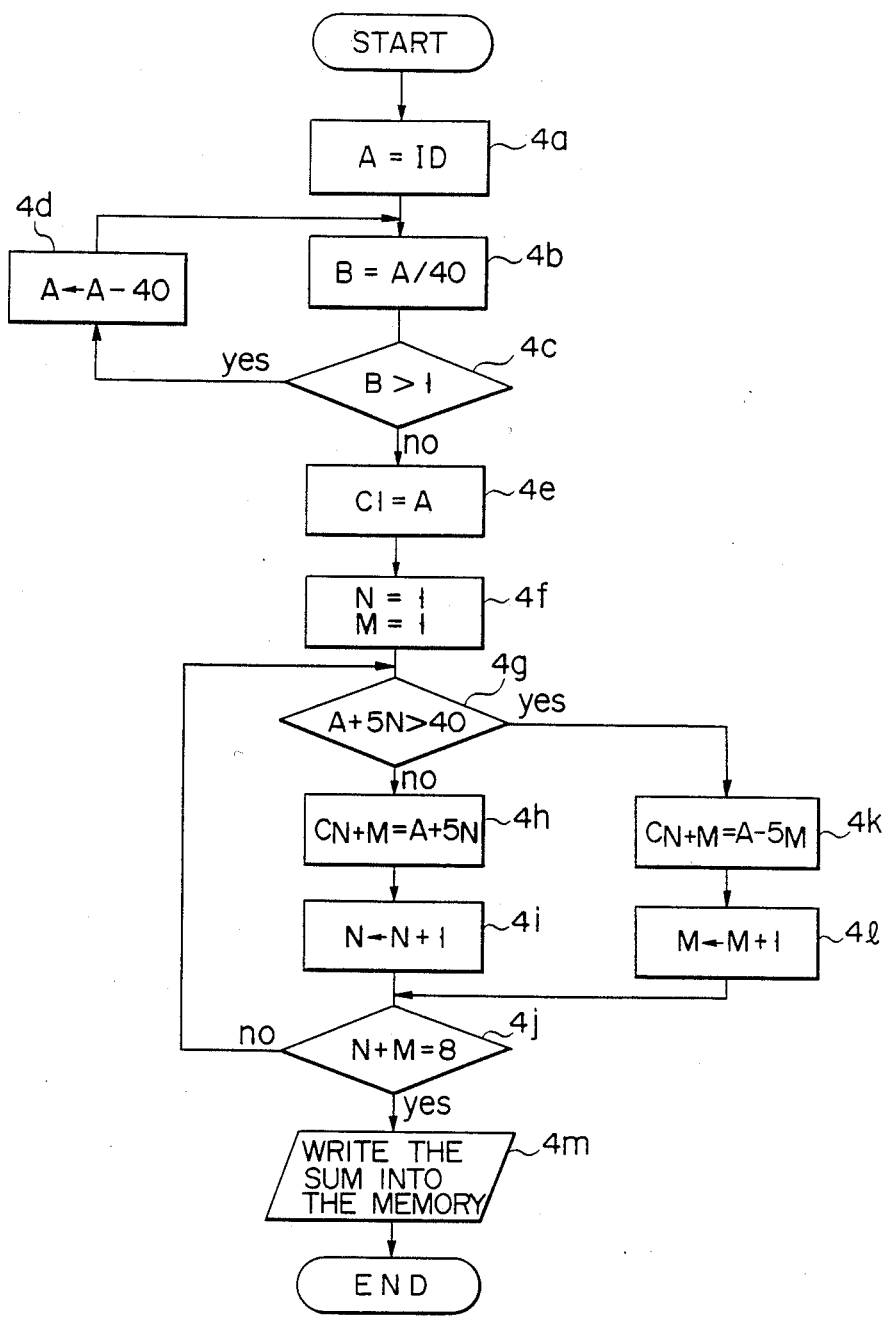
F I G. 6

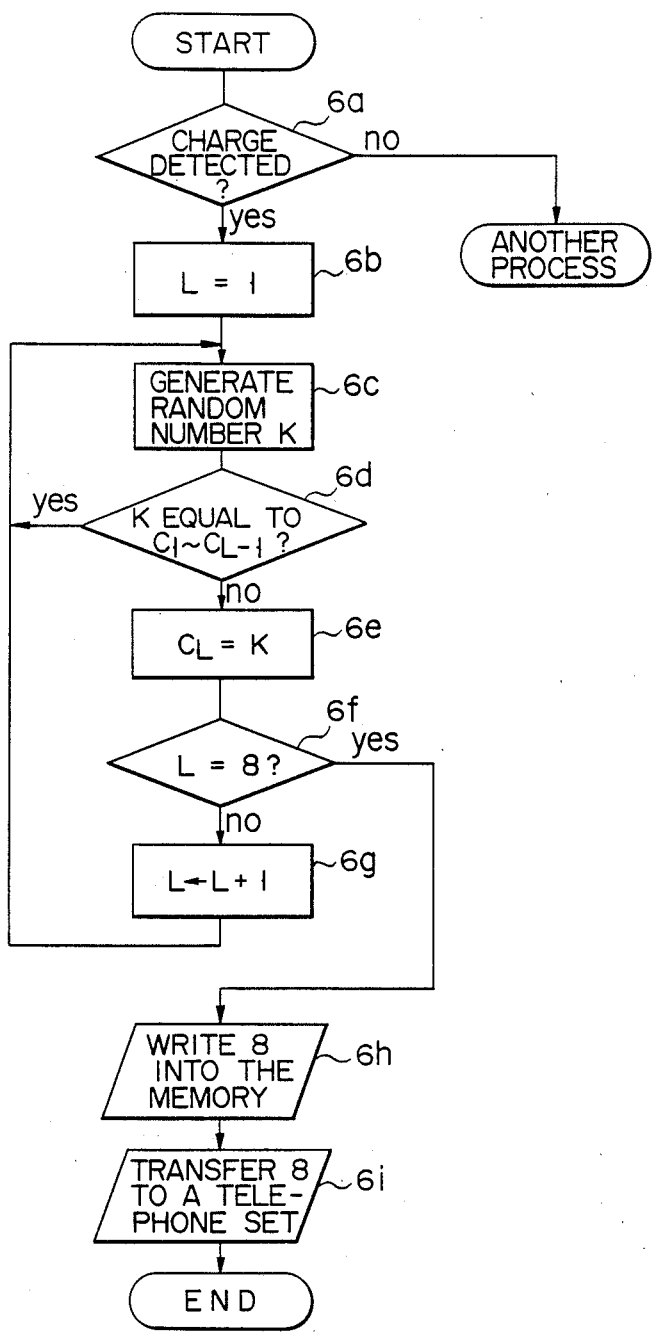
F I G. 8

RADIO CHANNEL SEARCH SYSTEM

FIELD OF THE INVENTION

1. Field of the Invention

This invention relates to a radio channel search system based on a multi-channel access system, and more particularly to a system for searching radio channels when moving stations such as mobile stations and a master station coupled with them by wireless paths are in a receive-ready idle mode.

2. Description of the Related Art

To effectively use radio channels, many types of communication systems based on the multi-channel access system have been developed. A typical example of the communication systems is a wireless telephone system. The wireless telephone system includes a plurality of wireless telephone subsystems which are respectively composed of fixed master stations $2a$ to $2n$ coupled with an exchange 5 by subscriber's lines as wire circuits, and wireless telephone sets $4a$ to $4n$ as mobile stations coupled with master stations $2a$ to $2n$ through wireless paths $3a$ to $3n$. These wireless telephone subsystems are each assigned with a plurality of wireless channels. To make a speech, each radio telephone subsystem selects an idle channel from those radio channels, to set up a wireless path, for example, between master station $2a$ and wireless telephone set $4a$ through wireless path $3a$. In this case, the combinations of master stations $2a$ to $2n$ and radio telephone sets $4a$ to $4n$ check if a connection request arrives. This check, i.e., receive search, is applied for all of the radio channels.

A conventional receive search will be described. Assume that 40 radio channels are assigned to the radio communication system. The receive search is sequentially applied for the 40 radio channels, starting at time t1 as shown in FIG. 2. After completion of this receive search, the power supply to the receivers and the synthesizers of those stations $2a$ to $2n$ and $4a$ to $4n$ are stopped for a fixed period Ts, to stop the receiving operation. After the rest period Ts, the receiving section is set in an operation mode, and the receive search is sequentially performed for the 40 radio channels, again. Subsequently, this sequence is repeated. The sum of the receive search period Tr and the receive rest period Ts, i.e., the period T of the receive search, is set within 3 seconds from the sending of an ID code as the connection request.

For the receive rest period Ts in such a system, 50 msec is required for one channel, in order to switch the synthesizer for the receive search. Therefore, the receive rest period Ts is $$Ts = T - Tr$$
$$= 3 - (50 \text{ msec} \times 40 \text{ ch})$$
$$= 1 \text{ sec}$$

This indicates that in the receive search, the wireless telephone subsystem operates for 2 seconds and rests for one second, viz., a called battery saving is performed. The average consumed current $I_B$ is $$I_B = \frac{Tr \times Ir - Ts \times Is}{Tr - Ts}$$
$$= \frac{2 \text{ sec} \times 100 \text{ mA} - 1 \text{ sec} \times 1 \text{ mA}}{2 \text{ sec} - 1 \text{ sec}}$$
$$= 67 \text{ mA}$$

where the consumed current Ir is 100 mA in the receive search mode, and the consumed current Is is 1 mA in the rest mode. This figure can save the consumed current by $\frac{2}{3}$ of that when the receive is always performed.

Telephone sets $4a$ to $4n$ use each a battery for a power source. In this respect, it is an essential matter that the consumed current is as low as possible. However, that is 67 mA as mentioned above, and this figure indicates that power consumption is large, and further improvement of power saving is needed. To solve this problem, there is an approach in which each wireless telephone subsystem is provided with a control channel dedicatedly for that subsystem, and in the receive search mode, only this control channel is received and monitored. However, this approach involves a problem that the number of radio channels used for the speech communication is reduced by the control channel, and as a result, an unsmooth speech path connection occurs.

The conventional radio channel search system is arranged so as to make the receive search of all of the 40 radio channels, e.g.. When the sender sends an ID code to a receiver by way of a radio channel, the average time till the receiver receives this ID code is long, so that the time for connection control is also long. Let us consider a case that the master station $2a$ sends an ID code by way of a radio channel "40" at time t2 immediately after wireless telephone set $4a$ makes the receive search of the radio channel "40". In this case, the time for wireless telephone set $4a$ to make the receive search of the channel "40" is approximately 3 seconds, and is very long.

As described above, in the conventional radio channel search system, all of the radio channels given are sequentially searched in the receive search mode. Therefore, the average consumed current is large. The time from an instant that the sender sends a connection request till the speech communication is allowed is long.

SUMMARY OF THE INVENTION

Accordingly, an object of this invention is to provide a radio channel search system which can reduce the average consumed current in the receive search mode without limiting the number of radio channels for speech communication, and reduce the connection time, and therefore is economical, and smoothly sets up a speech path.

To achieve the above object, there is provided a radio channel search system in use with a radio channel search system based on a multi-channel access system in which a plurality of moving units and at least one master station arranged as a counterpart of each of the moving units are provided, a plurality of radio channels are assigned to each of the plurality of moving units, in a receive-ready mode the moving units select an idle channel from those radio channels, to set up a radio communication path between the moving units and the master station. The radio channel search system is improved in that each moving unit includes means for storing the data of the numbers representing priority channels which are selected from radio channels and whose number is smaller than that of radio channels, control means for controlling the receive-ready mode by using the priority channel, and connection control means, wherein in the receive-ready mode, the receive-ready control means sequentially make the receive search of the priority channels according to the priority channel numbers stored in the priority channel storing means, and stop the supply of electric power to a receiving circuit section during the period that no receive search is performed, the connection control means detects an idle channel by the receive search when a cell unit sends a speech path formation request to the called unit in the receive-ready mode, and make a connection control between the call unit and the called unit by using the idle channel, and when receiving a connection request from the called unit in the receive search mode, the connection control means stops the receive search operation, and a predetermined connection control between the one station and the called station by the radio channel through which the connection request is received.

With such an arrangement, the average consumed current in the receive-ready mode can be reduced without limiting the number of radio channels for speech communication. The time required for the connection can also be reduced. Accordingly, this invention can provide a radio channel search system which is economical and can smoothly set up a speech path.

BRIEF DESCRIPTION OF THE DRAWINGS

FIG. 3 shows in functional block diagram a radio channel search system according to an embodiment of this invention;

FIG. 6 shows a flowchart for explaining the operation of a means for setting a priority channel in the radio telephone;

FIG. 8 shows a flowchart for explaining the operation of a means for setting the priority channel used in the radio telephone subsystem of FIG. 7.

DETAILED DESCRIPTION OF THE PREFERRED EMBODIMENTS

Figure 1:
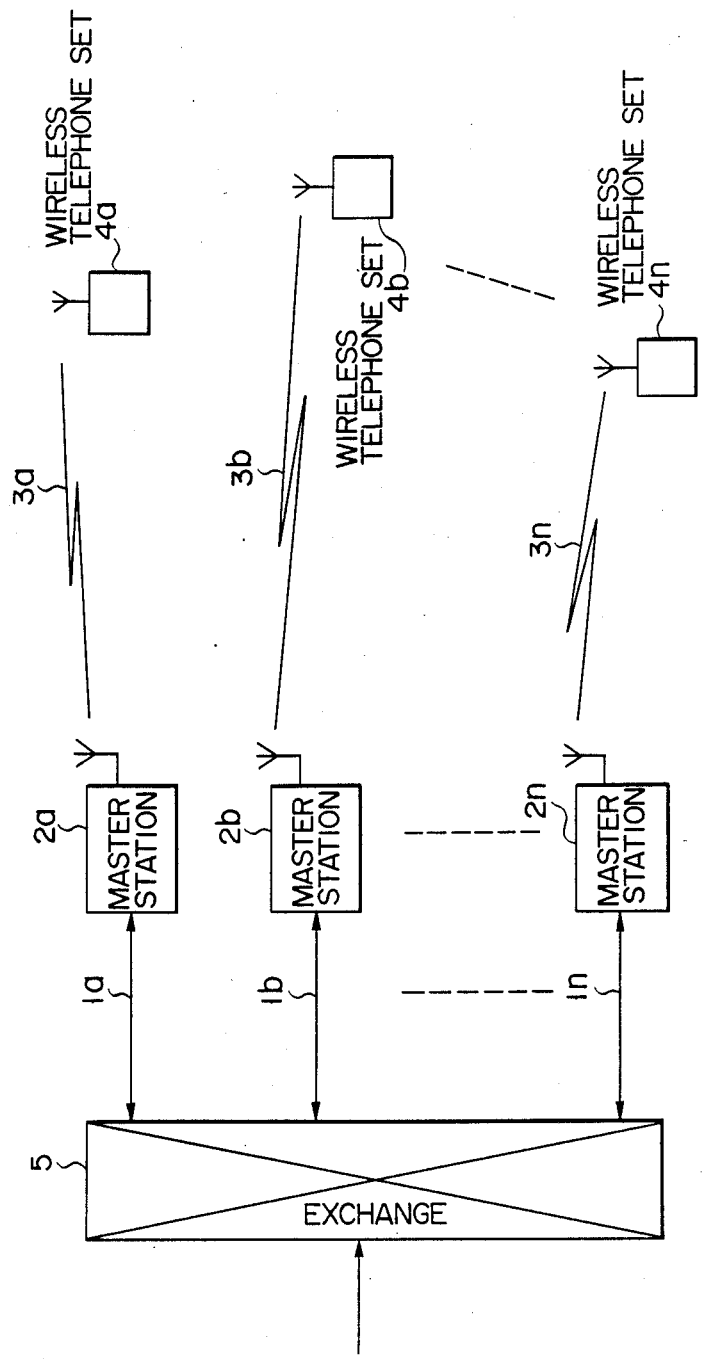
FIG. 1 shows a block diagram of an exemplar of a conventional mobile communication system.

A radio channel search system according to one embodiment of this invention will be functionally described referring to FIG. 3. As shown in FIG. 3, master station 12a and mobile units 14a-14n include memory means (12a-4, 14a-4) for storing the data of the the numbers representing priority channels which are selected from radio channels and whose number is smaller than that of radio channels, control means (12a-3, 14a-3) for controlling the receive-ready-mode by using the priority channel, and connection control means (12a-2, 14a-2). In the receive-ready mode, the receive-ready control means (12a-2, 14a-2) sequentially make the receive search of the priority channels according to the priority channel numbers stored in the priority channel storing means (12a-4, 14a-4). The receive-ready control means stop the supply of electric power to a receiving circuit section (14a-1) during the period that no receive search is performed, in the mobile station (14a to 14n). The connection control means (12a-2, 14a-2) detects an idle channel by the receive search when a call unit sends a speech path formation request to the called unit in the receive-ready mode, and make a connection control between the call unit and the called unit by using the idle channel. When receiving a connection request from the call unit in the receive search mode, the connection control means 14a-2 stop the receive search operation, and performs a predetermined connection control between the call unit and the called unit by the radio channel 13a-13n through which the connection request is received.

With such an arrangement, in the receive-ready mode, the mobile units 14a-14n and the master station 12a apply the receive search to only the priority channels which is smaller than all of the radio channels assigned to the mobile communication system. Therefore, the time for the receive search is reduced. The operation rest period of the receiving section may be elongated by the reduced time for the receive search. As a result, the average consumed current is reduced in the receive-ready mode. Further, the radio channel to be receive searched is specified. When one of units 14a-14n receives a connection request from a call unit as a counterpart of that unit, the average time taken for detecting the connection request can be reduced, resulting reduction of the connection time.

A radio telephone subsystem made up of master station 12a and radio telephone set 14a will be described. Master station 12a, which corresponds to the master station 12a of FIG. 3, is provided with transmitter (TX) 22 whose transmit and receive channels are designated by synthesizer (SYN) 21 and receiver (RX) 23. During the speech communication, a speech signal coming from the terminal of a call unit through subscriber's line 1 goes through line relay 24 and hybrid circuit 25, and is modulated by transmitter 22, and through duplexer 26 (DUP) and antenna 27, and is sent through antenna 27 to wireless path 13. A radio speech signal coming through wireless path 13 from mobile wireless telephone set 14a is led through antenna 27 and duplexer 26 to receiver 23 where it is demodulated. The demodulated speech signal is sent to subscriber's line 1 by way of hybrid circuit 25 and line relay 24. Master station 12a is further provided with incoming detector 28, receive electric field detector (C-DET) 29, and identifying code detector (ID-DET) 30, and controller (CONT) 31. Incoming detector 28 detects a call signal at 16 Hz coming through subscriber's line 1 from an exchange (not shown). The circuitry including these circuits is needed for setting up a path between subscriber's line 1 and wireless telephone set 14a. Receive electric field detector 29 includes a carrier squelch or a noise squelch circuit and monitors the incoming of radio wave from wireless telephone set 14a. ID code detector 30 verifies an identification (ID) code predetermined on the basis of the combination of master station 12a and wireless telephone set 14a, and notifies control circuit 311 of the result of verification. Control circuit 311 contains, for example, a microcomputer as a main control component, executes various types of controls to be given later. Rectifier/stabilizing circuit generates a given operating voltage Vcc, which is formed from a commercial power source, and supplies this voltage to each of master station 12a, and supplies it as a charge voltage to wireless telephone set 14a, by way of current restricting resistor 34 and feed terminal 33.

Wireless telephone set 14a, which corresponds to each of mobile units 14a to 14n shown in FIG. 3, is provided with transmitter (TX) 42 whose transmit/reception channels are designated by synthesizer (SYN) 41, and receiver (RX) 43, as in the case of master station 12a. In a busy mode, a radio speech signal coming through wireless path 13 is led through antenna 44 and duplexer (DUP) 47 to receiver 43 where it is demodulated. The demodulated signal is produced in the form of voice from receiver 45. A speech signal input from transmitter 46 is modulated by transmitter 42, and is sent to wireless path 13 via duplexer 47 and antenna 44. This wireless telephone set 14a is further provided with originating switch 48, dial key 49, receive electric field detector (C-DET) 50, ID code detector (ID-DET) 51, a control circuit (CONT) 521 including a microcomputer as a main control section, and executing various types of controls, and sounder 53 for generating a bell sound. Battery 54 is charged by operating voltage Vcc fed from feed terminal 33 of master station 12a, through charge terminal 55. These circuits are needed for the connection between master station 12a and the exchange.

Master station 12a and wireless telephone set 14a, respectively, include channel memories 35 and 56 each includes a RAM. These memories 35 and 56 are coupled with control circuits 311 and 521, and store the number data of priority channels, which are formed by these control circuits. The control circuits 311 and 521 of master station 12a and wireless telephone set 14a have a priority channel setting function and a receive-ready control function, in addition to a connection control function. According to the priority channel setting function, a predetermined calculation is performed on the basis of the ID code at the time of power on, thereby to set priority channels smaller than all of the radio channels, and the number data of these priority channels are written into channel memories 35 and 56. According to the receive-ready control function, in a receive-ready mode, the receive search is repeatedly made for all of the radio channels at predetermined periods, and the battery saving is repeatedly applied to the receive circuit section such as those circuits 21, 23, 41 and 43. In the receive search, all of the number data of the priority channels are read out from channel memories 35 and 56, and these priority channels are sequentially set in receivers 23 and 43 by synthesizers 21 and 41. The battery saving stops the power supply to receivers 23 and 43, synthesizers 21 and 41, and the respective detector circuits during other periods than the receive search periods.

The radio channel search system of this embodiment will be described on the basis of the arrangement as mentioned above. In this instance, it is assumed that the radio channels consist of 40 channels and of those 40 radio channels, 8 channels are used for priority channels. The number of the priority channels may appropriately be different for night and day, providing a better battery saving.

In master station 12a, upon power on, control circuit 311 performs various types of initializing operations, sets the priority channels. To be more specific, it is assumed now that ID number "000430" is detected by ID detector 30. As shown in FIG. 6, the ID code number is first loaded into register A in step 4a. In step 4b, the ID code number is divided by 40 as the number of radio channels, and the result of this division is loaded into register B. In step 4d, control circuit 311 checks if the contents of register B is larger than "1". If it is larger than "1", 40 is subtracted from the contents of register A in step 4d. Then, control circuit returns to step 4b where the division is performed, and the division result is compared with "1". A sequence of the above procedural operations is repeated until the contents of register B becomes smaller than "1". More exactly, since the ID code number is "000430", the operation is repeated until A=30 is obtained.

When the value in register B is less than 2", control circuit 311 writes the value in register A as the first priority channel number into register C1, in step 4e. In this case, the first priority channel number is "30". In step 4f, "1" is set in registers N and M, and in step 4g, the following operation is performed $$A + 5N > 40.$$

If $A+5N$ is larger than 40, control circuit 311 executes step 4h where $A+5N$ is written as the second priority channel number into register $CN+M$. Further, the control circuit increments the value of N in step 4i, and goes to step 4j. If $A+5N<40$ in step 4g, the control circuit goes to step 4k. In this step, t value of $A-5N$ is loaded as the second priority channel to register $CN+M$. In step 41, M is incremented and then step 4j is executed. Step 4j checks if $N+M$ is "8", viz., 8 priority channels have been set. Then, the control circuit returns to step 4g, and the priority channel number setting operation is repeated until $N+M=8$. Therefore, in this instance that the ID code number is "000430", the priority channel numbers are set: C1=30, C2=35, C3=40, C4=25, C5=20, C6=15, C7=10, and C8=5.

After completing the setting of 8 priority channels, control circuit 311 proceeds to step 4m. In this step, the priority channel numbers as loaded into registers C1 to C8 are transferred to and stored in channel memory 35. In this way, 8 priority channels are set.

In the case of radio telephone set 40, when battery 54 is set, or when the voltage of battery exceeds a predetermined value, control circuit 521 operates to set the priority channel numbers in a sequence of the procedural steps which is similar to that by control circuit 311. The priority channel numbers are stored into channel memory 56. Since the ID code number of radio telephone set 14a is the same as that of master station 12a, the priority channel numbers in radio telephone set 40 are the same as those in master station 12a.

Figures 2, 5:
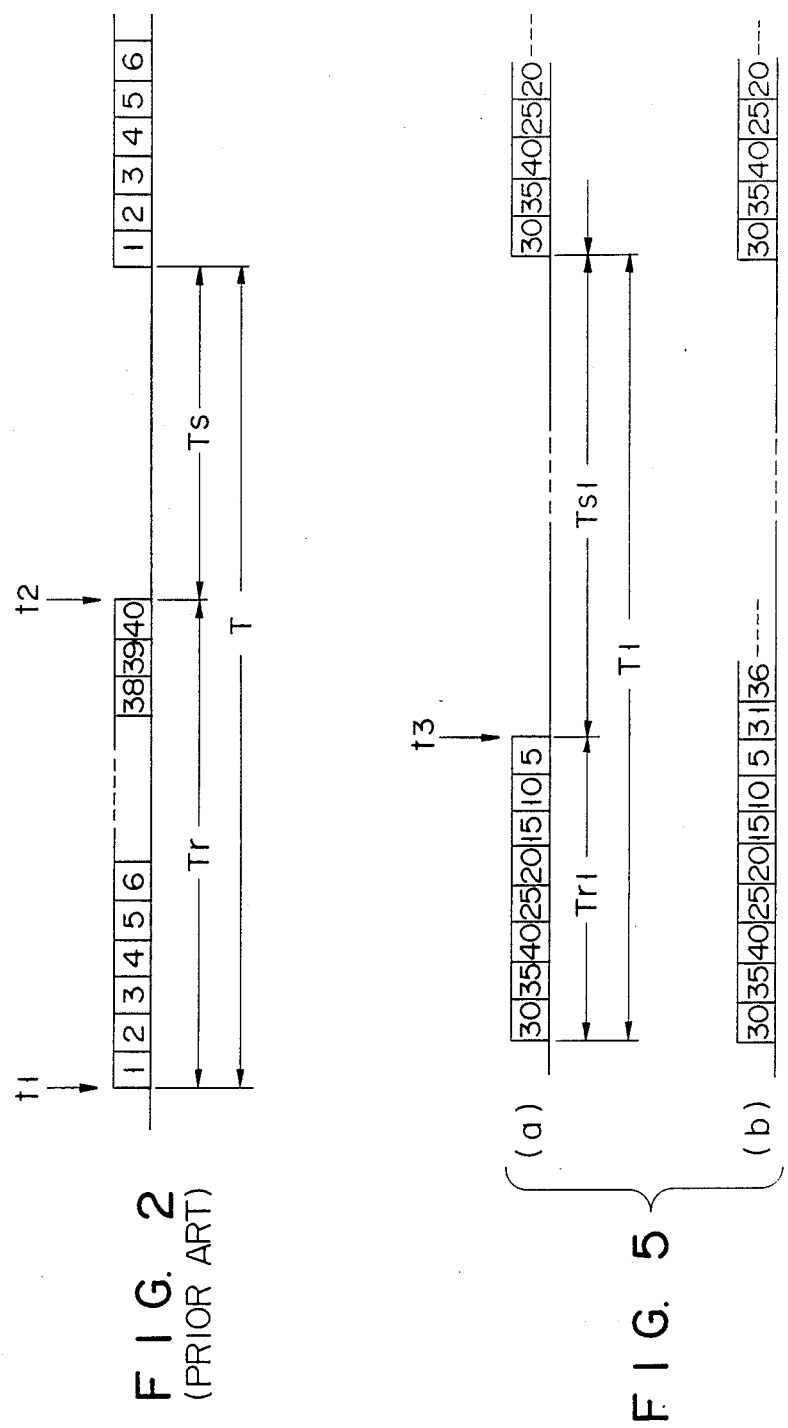
FIG. 2 shows a diagram for explaining the operation of the radio channel search system used in the FIG. 1 mobile communication system.
FIG. 5 shows a diagram for explaining the operation of the radio channel search system of FIG. 4.

In a receive-ready mode, master station 12a and radio telephone set 14a, control circuits 311 and 521, respectively, read out 8 priority channel numbers from channel memories 35 and 56 at a predetermined period, e.g., 3 seconds, thereby to control synthesizers 21 and 41 and to sequentially make the receive search of these priority channels, in the order of Nos. 30, 35, . . . 5, as shown in FIG. 5(a). After completion of the receive search of these eight priority channels, control circuits 311 and 521 stops the power supply to synthesizers 21 and 41, receivers 23 and 43, and the respective detectors, so that the receive circuit section is in a rest mode, viz., the battery saving is performed. The power supply stop operation is performed at timing t3 in response to the output signals of these controllers 311 and 521.

When the receive search time for each channel is 50 msec, the receive search time Tr1 in the receive-ready mode is $$Tr1 = 50 \text{ msec} \times 8 \text{ ch}$$
$$= 400 \text{ msec}.$$

This figure shows that the receive search time Tr is reduced 1/5 of that (2 sec) of the conventional radio channel search system, and that the rest time Ts1 is long. The average consumption current $I_{B1}$ of master station 12a and radio telephone set 14a is $I_{B1}$ $$I_{B1} = \frac{Tr1 \times 100 \text{ mA} + Ts1 \times 1 \text{ mA}}{Tr1 + Ts1}$$
$$= \frac{(500 \text{ msec} \times 4 \text{ ch}) \times 100 \text{ mA} + (3 \text{ sec} - 50 \text{ msec} \times 4 \text{ ch}) \times 1 \text{ mA}}{3 \text{ sec}}$$
$$= 7.6 \text{ mA}$$

In this case, the consumed currents Ir and Is are 100 mA and 1 mA in a receive search mode and in a rest mode, respectively. The figure of 7.6 mA is 1/9 of that of the conventional radio channel search system of FIG. 2 in which all of the radio channels (40 channels) are receive searched.

In this embodiment, when a call signal is generated from the subscriber's line 1 side, the control circuit 311 of master station 12a sequentially searches eight priority channels if there is an idle channel. This is made according to the presence or absence of the carrier at the corresponding frequency. When a first idle channel, i.e., the priority channel with no carrier at its frequency, is detected, the idle channel search is stopped, this idle channel is set as an idle channel, and subsequently a predetermined connection control is performed. When radio telephone set 14a generates a call signal, the control circuit 521 sequentially searches the 8 priority channels to find a first idle channel. The first idle channel detected is set as a speech channel, and a connection control is performed.

Figure 4:
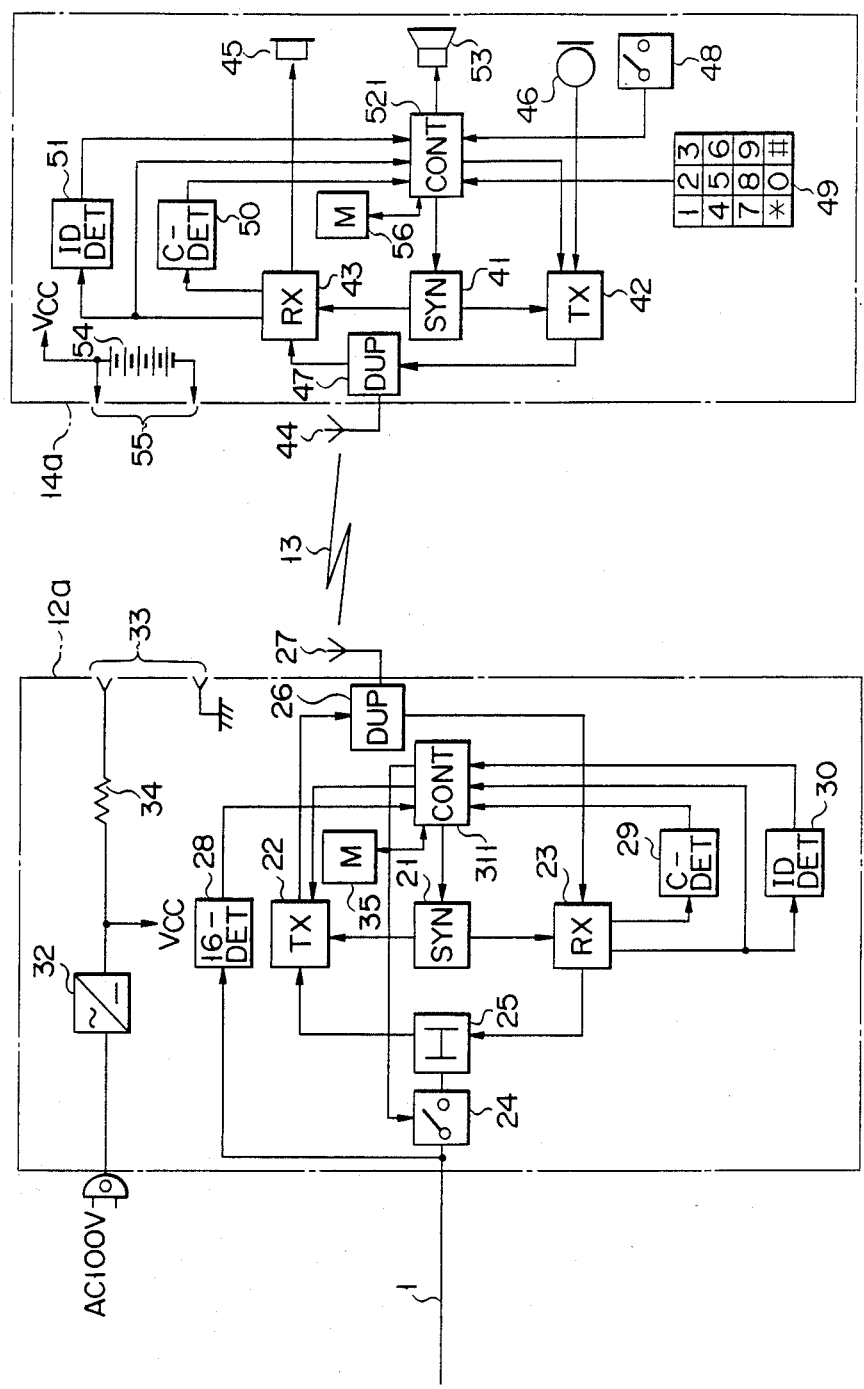
FIG. 4 shows a block diagram of a radio telephone subsystem to which the radio channel system search shown in FIG. 3 is applied.

In FIG. 4, a terminating signal is generated from the subscriber's line 1 side. The generation of this signal is detected by incoming signal detector 28. The control circuit 311 of master station 12a detects an idle channel by searching the priority channels. Upon detection of the idle channel, control circuit 311 seizes this radio channel, and causes transmitter 22 to transmit an ID code as a connection request. On the other hand, the control circuit 521 in radio telephone set 14a detects the carrier in the priority channels by the receive search in the receive-ready mode. When the incoming ID code is equal to that of the ID code of radio telephone set 14a per se, control circuit 521 stops the receive search, and sets this receive channel as a speech channel, and returns the ID code to master station 12a. In master station 12a, it receives the radio wave of the receiving channel from radio telephone set 14a, and decides that the ID code contained in the incoming wave is coincident with that of the master station 12a per se. Then, the control circuit of master station 12a decides that a radio path of master station 12a is connected to telephone set 14a, and stops the sending of the ID code. Master station 12a sends a ringing tone to telephone set 14a, to drive sounder 53 of telephone set 14a. In response to this call sound, a subscriber responds and telephone set 14a sends an off hook signal to master station 12a. At this time, line relay 24 is closed. In this way, a speech path is set up between telephone set 14a and a calling side, i.e., master station 12a, allowing a speech communication between the calling and called sides.

In a standby mode, if a subscriber turns on call switch 48 of radio telephone set 14a, the set 14a executes the receive search to find an idle channel. Then, it drives transmitter 42, and seizes the radio channel which is idle, and sends an ID code to master station 12a. In response to this, master station 12a detects the incoming of the radio wave transmitted through a proper radio channel, by the receive channel. When the ID code contained in the incoming radio wave is coincident with each other, the receive search is stopped. The receive channel is set as the speech channel, and telephone set 14a returns the ID code to master station 40. Telephone set 14a confirms that the ID code from master station 12a is coincident with that of the set itself, and decides that a radio speech path is formed between them, and stops the sending of the ID code. Under this condition, dial key 49 is operated to enter a telephone number of the called party to the telephone set. The entered dial code is sent to master station 12a, via the formed speech path. In master station 12a, when the dial code from telephone set 14a arrives after the speech path formation, line relay 24 disclosed according to this dial code, and dial pulses are sent to subsciber's line 1. In this way, a desired party is called. If a called party responds to this, a speech path is set up between the calling and called party, allowing a speech between them.

When an ID code is sent from master station 12a or radio telephone set 14a, a maximum of the connection time in 3 seconds, equal to that of the conventional radio channel search system. This figure is obtained when the called party sends and ID code at time t3 in FIG. 5(a), and the called party sends it through channel "5". In a normal traffic, t called party uses any of 8 priority channels for ID code reception, while the conventional radio channel search system must use any of 40 channels. Therefore, the average connection time is remarkably reduced.

If a further reduction of the connection time is desired, one period T1 in a receive-ready mode, or the sum of receive search time tr1 and rest time Ts1, may be set at 2 seconds. In this case the average consumed current $I_{B2}$ in a receive-ready mode is $$I_{B2} = \frac{(50 \text{ msec} \times 4 \text{ ch}) \times 100 \text{ mA} + (2 \text{ sec} - 50 \text{ msec} \times 4 \text{ ch}) \times 1 \text{ mA}}{2 \text{ sec}}$$
$$= 10.9 \text{ mA}$$

This figure indicates a slight increase of consumed current, but is about 1/6 that of the conventional system. Thus, this embodiment of this invention successfully realizes the power saving and the connection time reduction.

There is a case that all of 8 priority channels are searched for idle channel finding, but these channels are all busy. In such a case, other channels are further searched. When all of the priority channels C1 to C8, for example, are all busy, C1+1, C2+1, ..., C8+1 are set up by an appropriate operation. These channels are searched till an idle channel is detected, as shown in FIG. 5(b). If these channels are all busy, C1+2, ... C8+2 are further set up, and these channels are subjected to the idle channel search. If an idle channel is not detected yet, a similar operation is further continued till it is detected. This approach can seize an idle channel even when the traffic is heavy, resulting in improvement of "tuuwa kanryouritu".

Alternatively, the channels to be searched for idle channel finding may be set at channel numbers 1, 2, 3, . . . . These may be set by another operation. The essential matter for setting these channels is that it is based on some predetermined rule.

Figure 7:
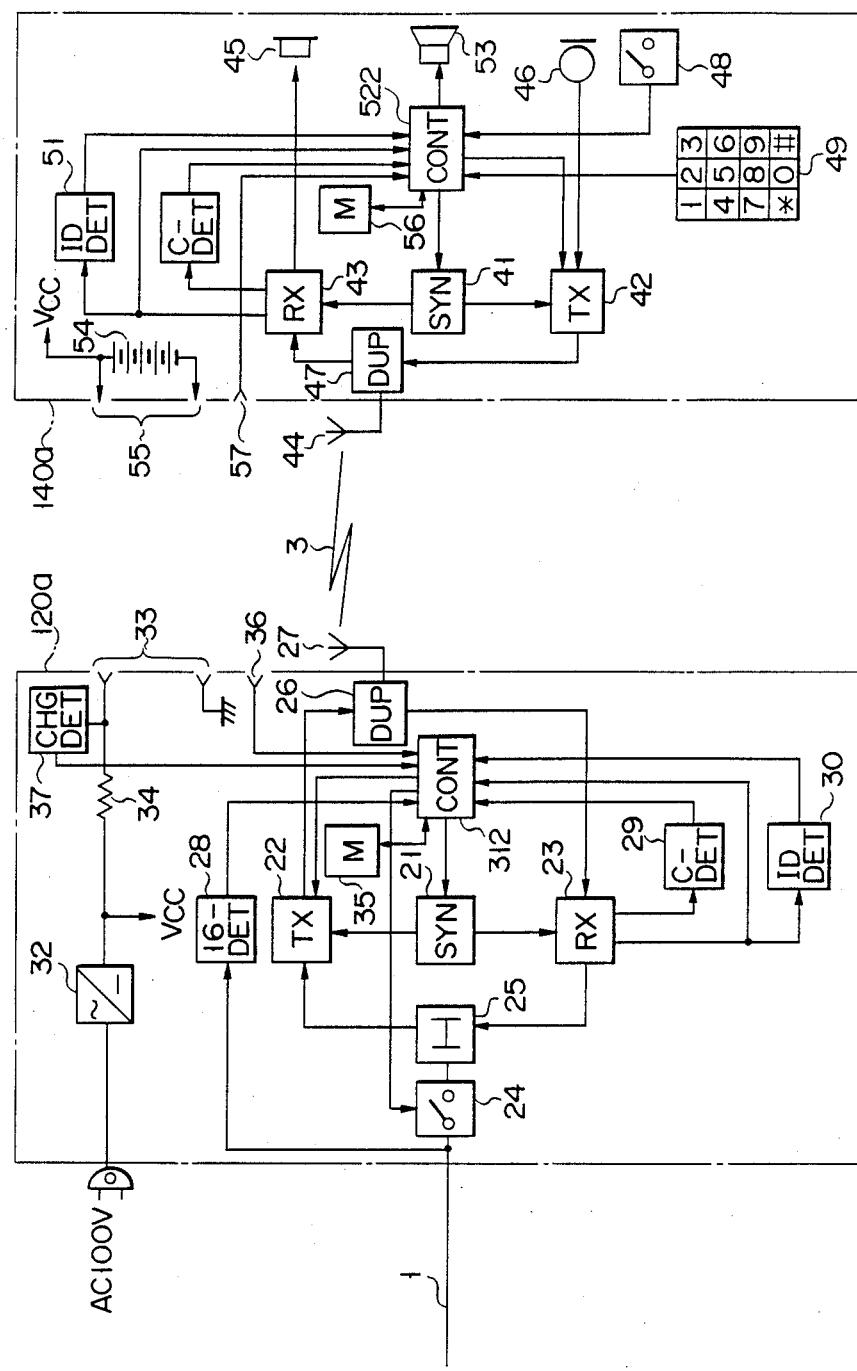
FIG. 7 shows a block diagram of a radio telephone subsystem to which a radio channel search system according to another embodiment of this invention is applied.

Turning now to FIG. 7, there is shown an arrangement of a radio telephone subsystem incorporating a radio channel search system according to another embodiment of this invention. In the figure, like portions are designated like symbols in FIG. 4. In the figure, master station 120a is provided with charge detector 37 and data transfer terminal 36, in addition to channel memory 35. Radio telephone set 140a is additionally provided with data input terminal 57. When the charge terminal 55 of radio telephone set 140a is mounted to feed terminal 33 of master station 120a, and charge to battery 54 starts, charge detector 37 detects the start of charge from the voltage drop across current restricting resistor 34. The detect signal is supplied to control circuit 312. Data transfer terminal 36 and data input terminal 57 are connected with each other when the charge terminal 55 of telephone set 140a is mounted to feed terminal 33 of master station 120a.

With such an arrangement, to charge battery 54 of radio telephone set 140a, charge terminal 55 is set to feed terminal 33 of master station 120a, master station 120a feeds charge current to battery 54 of telephone set 140a, and the charge to the battery starts. The control circuit 312 of master station 120a receives a detect signal from charge detector 37 to know the start of charge, and subsequently enters the mode of controlling the setting of priority channels. More exactly, in step 6b, control circuit 312 sets up L=1, and in step 6c causes a random number generating means to generate random number K. In step 6d, the set random number K is equal to any of the current priority channel numbers C1 to CL-1. This random number is read out of a ROM, for example. If it is not equal, in step 6e random number K is set as the priority channel number to CL (CL=K). If these are equal, the control circuit returns to step 6c, and the random number K is generated again. In step 6e, CL=K is set up, and then control circuit 312 goes to step 6f to check if L=8. If not, the control circuit repeats the setting of the priority channel numbers while incrementing L till L=8 in step 6g. After completion of the 8 priority channel number setting, control circuit 312 executes step 6h, and writes the 8 priority channel numbers into channel memory 35. Then, in step 6i, these eight priority channel numbers are transferred to control circuit 521 of telephone set 140a, through data transfer terminal 36, and data input terminal 57 of telephone set 140a.

Control circuit 522 of radio telephone set 140a stores into channel memory 56, the priority channel number data as transferred by way of data input terminal 57. The priority channel numbers of eight channels are stored into these channel memories 35 and 56, and those numbers stored in the memories are equal to each other, and stored randomly.

In the radio channel search system thus arranged, the idle channel is selected from the prior channels randomly stored, and the speech communication is performed on the basis of the selected idle channel. This feature improves the secrecy of speech communication.

It is evident that this invention is not limited to the specific embodiments as mentioned above, and may be variously changed and modified within the scope of this invention. While the priority channel setting is performed at the time of charge start of the telephone set, but it may be made every time the speech ends. In this case, a random number is generated by the master station or the radio telephone set when the speech communication progresses. A predetermined number of priority channels are set according to the random number. At the end of speech, the number data of these priority channels are stored in the channel memory of the calling station. The stored channel number data is transferred to the called station through a speech path, and stored in the channel memory of the called station. Then, a turn-off signal is sent, and the system is placed again in a receive-ready mode. With such an arrangement, even if the battery of the telephone set is not charged, the random priority channels may be set anew, and the privacy of the speech may be held. In the above-mentioned embodiments, the idle channel search for the priority channels is performed in the order of the channels stored in the channel memory. Alternatively, an idle channel is detected every receive search, and the idle channel search order may be changed on the basis of the detected idle channel so as to quicken the idle channel search. Additionally, the number of set priority channels, the receive-ready control means, the controls and the control order of the connection control means, and types of the communication system may be variously changed within the scope of this invention.

As seen from the foregoing description, the present invention has successfully provided a radio channel search system in use with a communication system based on a multi-channel access system in which a plurality of moving units and at least one master station arranged as a counterpart of each of the moving units are provided, a plurality of radio channels are assigned to each of the plurality of moving units, in a speech mode the moving units selects an idle channel from those radio channels, to set up a radio communication path between the moving units and the master station, the radio channel search system improved in that each moving unit includes means for storing the data of the the numbers representing priority channels which are selected from radio channels and whose number is smaller than that of radio channels, control means for controlling the receive-ready mode by using the priority channel, and connection control means, wherein in the receive-ready mode, the receive-ready control means sequentially make the receive search of the priority channels according to the priority channel numbers stored in the priority channel storing means, and stop the supply of electric power to a receiving circuit section during the period that no reception search is performed, the connection control means detects an idle channel by the receive search when a call party sends a speech path formation request to the called party in the receive-ready mode, and make a connection control between the call party and the called party by using the idle channel, and when receiving a connection request from the called party in the receive search mode, the connection control means stops the receive search operation, and a predetermined connection control between the call party and the called party by the radio channel through which the connection request is received.

Therefore, the average consumed current in the receive-ready mode can be reduced without limiting the number of radio channels for speech communication. The time required for the connection can also be reduced. Accordingly, this invention can provide a radio channel search system which is economical and can smoothly set up a speech path.

What is claimed is:

1. A radio channel search system in use with a communication system based on a multi-channel access system in which a plurality of moving units and at least one master station arranged as a counterpart of each of said moving units are provided, a plurality of radio channels are assigned to each of said plurality of moving units, in a speech mode the moving unit selects an idle channel from those radio channels, to set up a radio communication path between said moving unit and said master station; wherein said master station and each moving unit include means for storing data of numbers representing priority channels which are selected from all radio channels, with the number of the priority channels being smaller than that of the radio channels; control means for controlling a receive-ready mode by using said priority channel, and connection control means coupled to said priority channel numbers storing means and said control means, and wherein in the receive-ready mode, said control means sequentially and repeatedly makes the reception search of said selected priority channels according to the priority channel numbers stored in said priority channel number storing means and step supply of electric power to a receiving circuit section during the period that no reception search is performed, said connection control means detects in idle channel by said receive search when a calling moving unit sends a speech path formation request to a called moving unit in the receive-ready mode, and make a connection control between one of said units and said master station by using said idle channel, and when receiving a connection request in said receive search mode, said connection control means stop the receive search operation, and a predetermined connection control between one of said units and said master station by a radio channel through which said connection request is received.

2. The radio channel search system according to claim 1, wherein said priority channel memory means stores selected priority channels every time the supply of the electric power is started.

3. The radio channel search system according to claim 1, wherein said priority channel memory means stores new data representing numbers of new priority channels selected by using a random number when the moving unit is in a battery charge mode or in a busy mode, and transfers the new data to a corresponding station and units to store them therein.

* * * * *